United States Patent
Gallagher, III et al.

[19]

[11] Patent Number: 5,959,531
[45] Date of Patent: Sep. 28, 1999

[54] OPTICAL INTERFACE BETWEEN RECEIVER AND TAG RESPONSE SIGNAL ANALYZER IN RFID SYSTEM FOR DETECTING LOW POWER RESONANT TAGS

[75] Inventors: William F. Gallagher, III, Phoenixville, Pa.; Russell E. Barber, Thorofare, N.J.

[73] Assignee: Checkpoint Systems, Inc., Thorofare, N.J.

[21] Appl. No.: 09/122,121

[22] Filed: Jul. 24, 1998

[51] Int. Cl.[6] .................................................. G08B 13/187
[52] U.S. Cl. .................. 340/572.1; 340/531; 340/572.5; 359/173
[58] Field of Search .................... 340/572.1, 572.5, 340/531; 359/173, 109

[56] References Cited

U.S. PATENT DOCUMENTS

| | | | |
|---|---|---|---|
| 3,737,676 | 6/1973 | Fletcher et al. | 327/117 |
| 3,959,737 | 5/1976 | Tanis | 331/1 A |
| 4,009,455 | 2/1977 | Ishigaki et al. | 332/127 |
| 4,274,089 | 6/1981 | Giles | 340/572.2 |
| 4,422,053 | 12/1983 | Brewerton et al. | 332/127 |
| 4,551,712 | 11/1985 | Fockens | 340/572.2 |
| 4,623,877 | 11/1986 | Buckens | 340/572.2 |
| 4,694,475 | 9/1987 | Mehrgardt | 377/48 |
| 4,710,752 | 12/1987 | Cordery | 340/551 |
| 4,975,681 | 12/1990 | Watkins et al. | 340/572.4 |
| 5,038,117 | 8/1991 | Miller | 331/16 |
| 5,121,103 | 6/1992 | Minasy et al. | 340/551 |
| 5,151,684 | 9/1992 | Johnsen | 340/568.1 |
| 5,288,980 | 2/1994 | Patel et al. | 235/381 |
| 5,349,332 | 9/1994 | Ferguson et al. | 340/572.5 |
| 5,353,011 | 10/1994 | Wheeler et al. | 340/572.4 |
| 5,382,952 | 1/1995 | Miller | 340/825.54 |
| 5,414,410 | 5/1995 | Davies et al. | 340/551 |
| 5,440,300 | 8/1995 | Spillman, Jr. | 340/525.54 |
| 5,517,179 | 5/1996 | Charlot, Jr. | 340/572.2 |

*Primary Examiner*—Glenn Swann
*Attorney, Agent, or Firm*—Panitch Schwarze Jacobs & Nadel, P.C.

[57] ABSTRACT

Noise reduction schemes are provided in a radio frequency identification (RFID) system for use with RFID intelligent tags. Fiber optics are used to communicate analog tag response signals from the output of the receiver circuit to the input of a tag response signal analyzing module, which includes a digital signal processor (DSP). The fiber optics creates electrical isolation between these circuit elements breaking ground loops, stopping internal switching noise from the DSP from entering the receiver circuitry, and preventing common mode signals from interfering with the desired RFID tag signal.

4 Claims, 10 Drawing Sheets

(SECURITY TAG DATA)

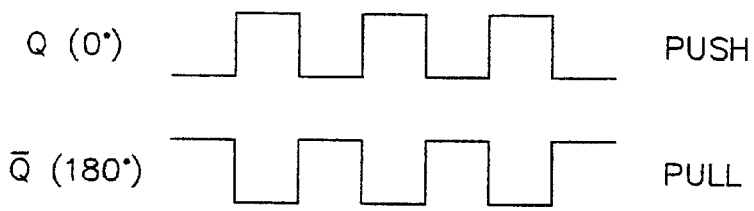
Fig. 7
Fig. 8
(Prior Art)
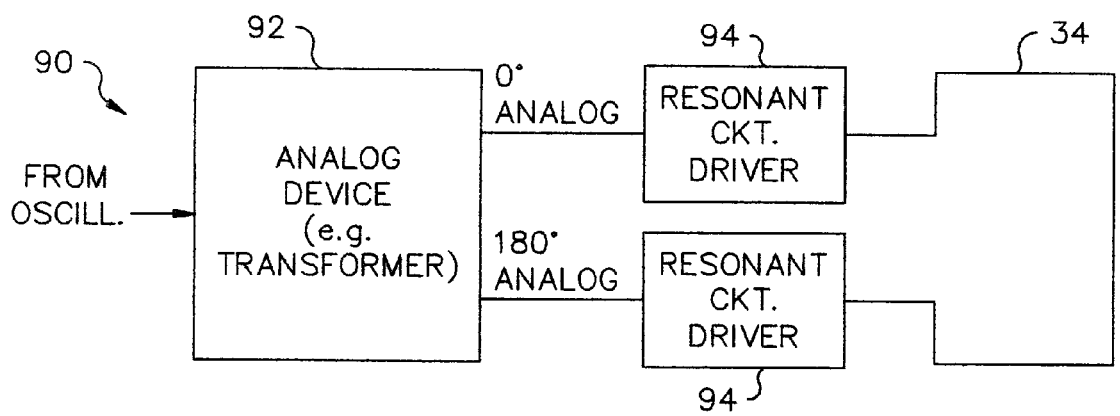
Fig. 9
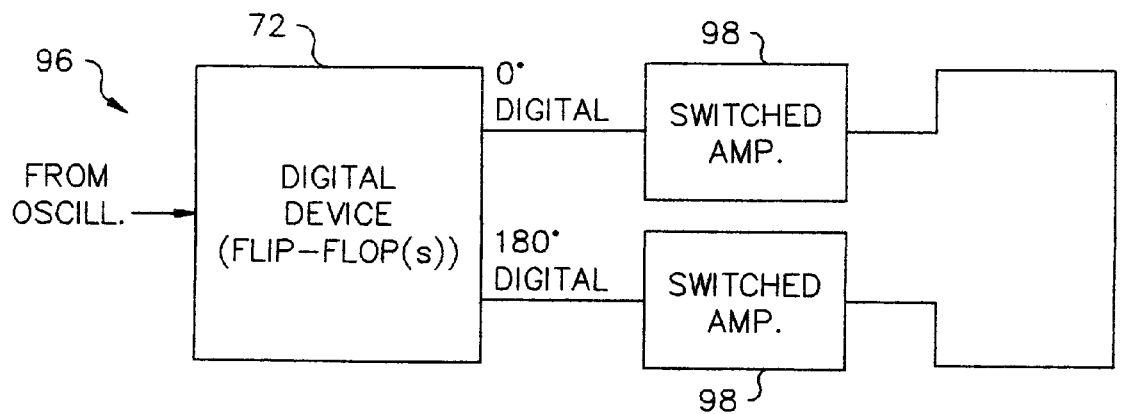

OPTICAL INTERFACE BETWEEN RECEIVER AND TAG RESPONSE SIGNAL ANALYZER IN RFID SYSTEM FOR DETECTING LOW POWER RESONANT TAGS

BACKGROUND OF THE INVENTION

Radio frequency identification (RFID) systems are used to detect and prevent inventory shrinkage and to perform inventory management functions in a variety of retail establishments, apparel and mass merchandisers, supermarkets, libraries, video stores, and the like. In general, such systems use an intelligent tag which is secured to or associated with an article (or its packaging), typically an article which is readily accessible to potential customers or facility users. The process wherein intelligent tags are secured to or associated with an article (or its packaging) is often referred to as "tagging" the article. In general, such RFID systems are employed for detecting the presence (or the absence) of a unique intelligent tag and, thus, a protected article within a surveilled security area or detection zone, also referred to herein as an "interrogation zone." The detection zone is located at or around an exit or entrance to the facility or a portion of the facility, at the point of sale, or proximate to a hand-held, portable interrogator.

One type of RFID system which has gained widespread popularity uses an intelligent tag which includes a self-contained, passive resonant circuit in the form of a small, generally planar printed circuit which resonates at a predetermined detection frequency within a detection frequency range. A transmitter, which is also tuned to the detection frequency, transmits electromagnetic energy or an interrogation signal into the detection zone. A receiver, tuned to the detection frequency detects amplitude disturbances on the electromagnetic field that are imparted by the intelligent tag. When an article having an attached intelligent tag moves into or passes through the detection zone, the intelligent tag is exposed to the transmitted energy. That is, the intelligent tag is interrogated. The detection of such an output signal by the receiver indicates the presence of an article with an intelligent tag within the detection zone and the receiver activates an alarm to alert appropriate security or other personnel.

One well-known RFID system has a transmitting and detecting frequency in the radio frequency range. The intelligent tags used with such systems are referred to as RF tags or RF intelligent tags. The RF tags associated with each article may be identical so that all articles having an intelligent tag, regardless of article size or value, return an identical signal to the receiver. Alternatively, the RF tags may be passive resonant intelligent tags which return unique identification codes. U.S. Pat. Nos. 5,446,447 (Carney et al.), 5,430,441 (Bickley et al.), and 5,347,263 (Carroll et al.) disclose three examples of such intelligent tags. These intelligent tags typically include an integrated circuit to generate a unique identification code. Such "intelligent" intelligent tags provide additional information about the article detected in the zone of the interrogator. These intelligent tags typically respond to, and transmit signals, in the radio frequency range, and are known in the art as "radio frequency identification (RFID) tags or "intelligent tags." RFID tags are used in RFID systems. intelligent tags may also resonate at non-RF frequency bands, and may be referred generically as "EAS markers."

Existing RFID systems of the type described above and of other types have been shown to be effective in preventing the theft or unauthorized removal of articles.

FIG. 1 shows a conventional transceiver assembly 10 of an RFID system. The assembly includes a pair of spaced pedestal transceiver antennas 12 and 12' which define a detection zone 14 therebetween. In one conventional scheme, transmitter and receiver coils are placed in each of the antennas 12 and 12'. In another conventional scheme, a transmitter coil is placed in the antenna 12 and a receiver coil is placed in the antenna 12'. The maximum size of the detection zone 14 depends largely upon the "read range" of the intelligent tags used in the RFID system. The "read range" is the range in which a passive resonant signal can be accurately detected and discriminated by the signal receiving apparatus.

Passive resonant signals are relatively low power signals and must be discriminated within a relatively noisy environment. There are many sources of potential noise in the detection zone 14, such as signals from other intelligent tags, signals generated by interaction of the transmitter frequencies with metal objects and neighboring electrical equipment. Furthermore, the RFID system itself is a significant source of noise.

In the RFID system, significant amplitude and phase noise are produced from the oscillator used to generate the fundamental field frequency of the transmitter loop antenna. Furthermore, significant amounts of noise travels on the signal path between the transceiver electronics and the circuitry for processing the analog tag signals. This signal path is hardwired in conventional RFID systems. See, for example, U.S. Pat. No. 4,623,877 (Buckens). Ground loops and common mode signals introduce noise along this signal path. Switching noise from digital signal processing (DSP) circuitry for processing the analog tag signals is often found on the signal path. DC power lines which supply power to the transceiver electronics and to the circuitry for processing the analog tag signals also introduce noise on the signal path.

Such noise decreases the signal-to-noise ratio of the tag response signal and thereby limits the read range. The noise problem gets worse as the antennas 12 and 12' are moved further apart, since the tag signal weakens with distance from the receiver antenna, whereas potential environmental noise sources increase with distance from the receiver antenna. Furthermore, governmental authorities, such as the Federal Communications Commission (FCC), regulate radiation emission levels in the frequency range used by RFID systems and do not allow emission levels to exceed maximum predetermined levels. This further limits the strength of the signals allowed in the detection zone, thereby constraining the read range. Many conventional RFID systems currently operate at or near the FCC limits.

Conventional RFID systems experience tag reading problems even when the read range is an acceptable value. For example, the signal from one particular intelligent tag may be missed due to unexpected noise in the detection zone or due to a low signal-to-noise ratio as a result of a weak or significantly attenuated tag response signal. Thus, conventional RFID systems sometimes fail to "hear" small signals, or even normal strength signals when the environment is unusually noisy.

Typically, the spacing between the transceiver antennas 12 and 12' is in the range of from three to six feet depending upon the particular RFID system and the particular application in which the system is employed. However, to avoid inhibiting the entry/exit to a store, it is desirable that the antennas be spaced from each other by at least the width of the entry/exit, which may be six feet or greater in some types of stores (e.g., home centers). It is also sometimes desirable to hide the antenna apparatus. However, it is not feasible to hide the antenna apparatus if the antennas must be a very close to each other to obtain acceptable performance. Thus, antenna placement options are constrained in conventional RFID systems.

One scheme for increasing the read range of an RFID system is described in copending U.S. application Ser. No. 08/783,423, filed Jan. 14, 1998, entitled "Multiple Loop Antenna." However, this scheme addresses the antenna S design, and does not address the problem of noise generated by the RFID system itself, and by other external noise sources.

In sum, there is a significant, long-felt and presently unmet need to improve the detection capabilities and read range of RFID system electronics without violating governmental regulations on field strength.

The present invention fulfills this need by providing methods and systems which significantly reduce background noise produced by external/environmental sources and internal RFID system components, thereby providing an RFID system which has an improved read range, and which can hear weaker signals.

BRIEF SUMMARY OF THE INVENTION

The present invention provides an RFID system having a detection zone for detecting the presence of an article in the detection zone wherein the article is tagged with a resonant intelligent tag. The RFID system includes a receiver circuit, a tag response signal analyzing circuit, and an optical fiber interface connected therebetween. The receiver circuit outputs a demodulated analog tag response signal upon detection of the intelligent tag in the detection zone. The tag response signal analyzing circuit includes an input, and a digital signal processing circuit which processes the analog tag response signal and outputs therefrom intelligent tag data. The optical fiber interface is connected at one end to the output of the receiver circuit and is connected at the other end to the input of the tag response signal analyzing circuit for communicating the analog tag response signal from the receiver circuit to the tag response signal analyzing circuit.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 7 is a diagram of the outputs of a flip-flop in FIG. 6;

FIG. 8 is a schematic block diagram of a conventional scheme for producing phase split signals to drive an RFID transmitter antenna; and FIG. 9 is a schematic block diagram of a scheme for producing phase split signals to drive an RFID transmitter antenna in accordance with the present invention.

DETAILED DESCRIPTION OF THE INVENTION

Figure 1:
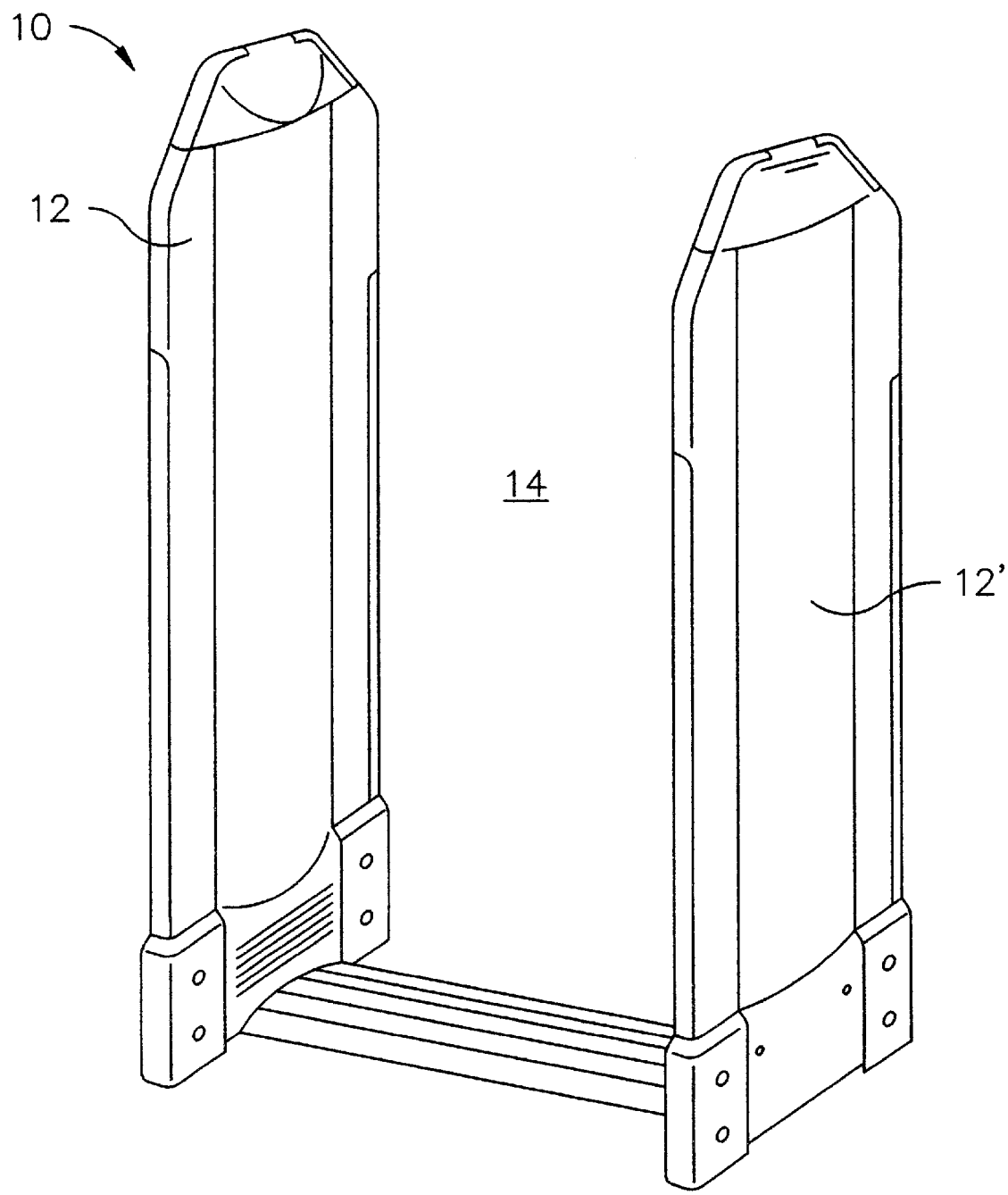
FIG. 1 is a perspective view of pedestal antennas of a conventional RFID system.

Certain terminology is used herein for convenience only and is not to be taken as a limitation on the present invention. In the drawings, the same reference numerals are employed for designating the same elements throughout the several figures.

The system architecture of the RFID system in the present invention includes a plurality of elements for reducing noise within the RFID system. The resultant RFID system has better detection capabilities, or equivalently, a greater read range for RFID tags. Key elements are summarized herein as follows:

1. The system provides a local oscillator with low amplitude and phase noise. Noise components are minimized by starting with a low noise crystal oscillator having an output frequency which is an integer multiple n of the desired RF field frequency, and then dividing this frequency by the integer multiple n. In one disclosed example, n=2 and the RF field frequency is 13.56 MHz. Thus, the crystal oscillator has an output frequency of 27.12 MHz. The output frequency is passed through a frequency divider (a "divide by 2" circuit in this example) to obtain a reduced noise 13.56 MHz signal for driving the transmitter antenna. The same principle may be used for values of n greater than 2. For example, if n=4, an oscillator is selected which has an output frequency of 54.24 MHz and this signal is passed through a 4× frequency divider (i.e., a "divide by 4" circuit) to obtain a reduced noise 13.56 MHz signal for driving the transmitter antenna.

2. Fiber optics are used to communicate analog tag response signals from the output of the receiver circuit to the input of the tag response signal analyzing circuitry (which includes a digital signal processor (DSP)). Generally speaking, the system architecture is thus physically separated into analog and digital sections. The fiber optics creates electrical isolation between the two sections, breaking ground loops, stopping internal switching noise from the DSP from entering the sensitive front end detector (i.e., the receiver circuitry), and preventing common mode signals from interfering with the desired RFID tag signal.

3. Filtering is provided on the DC power lines which prevents extraneous signals, either internal or external, from interfering with desired tag signals. The filtering is targeted toward high and low frequency interference, which may be common mode or differential.

Each of these elements significantly reduces noise, and may be used individually, or in combination, in the RFID system. A detailed explanation of each of the elements is provided below.

Figure 2:
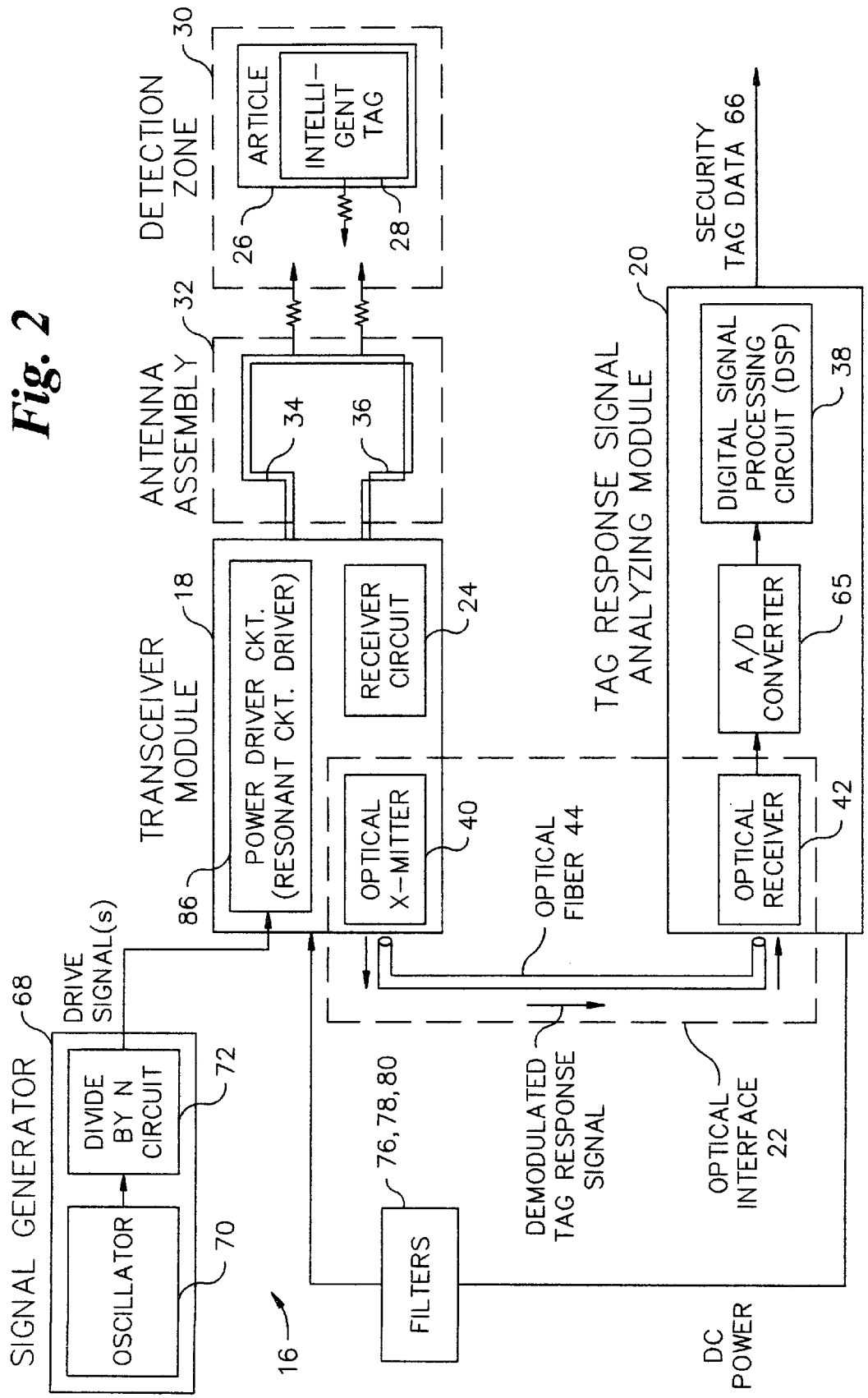
FIG. 2 is a schematic block diagram of selected components of an RFID system in accordance with the present invention.
Figures 1, 3A:
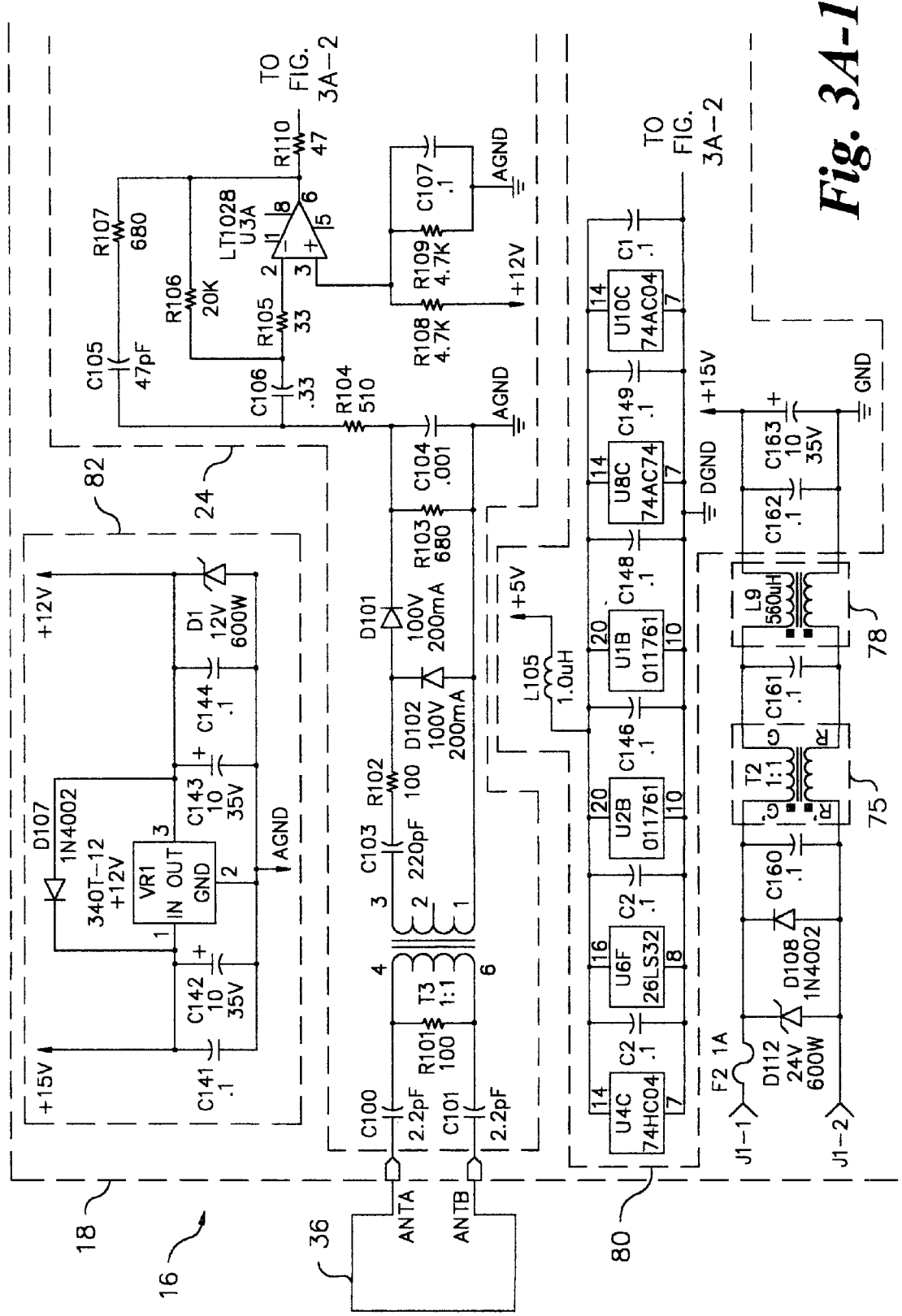
FIGS. 3A and 3B, taken together, is a combination detailed component level circuit diagram/schematic block diagram showing the individual components of the RFID system of FIG. 2, as well as additional components of an RFID system in accordance with the present invention.
Figures 2, 3A:
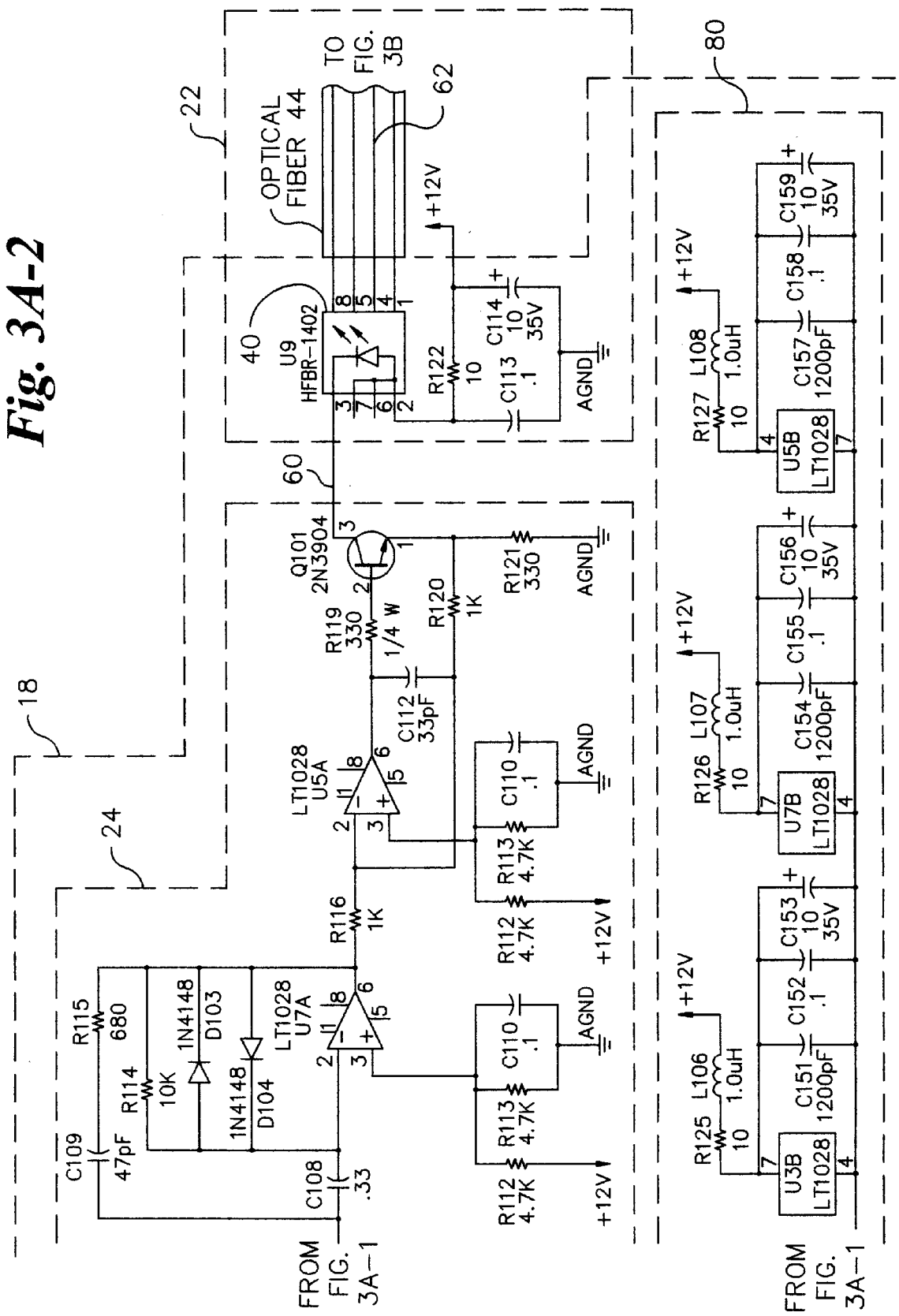
Figures 3, 3A:
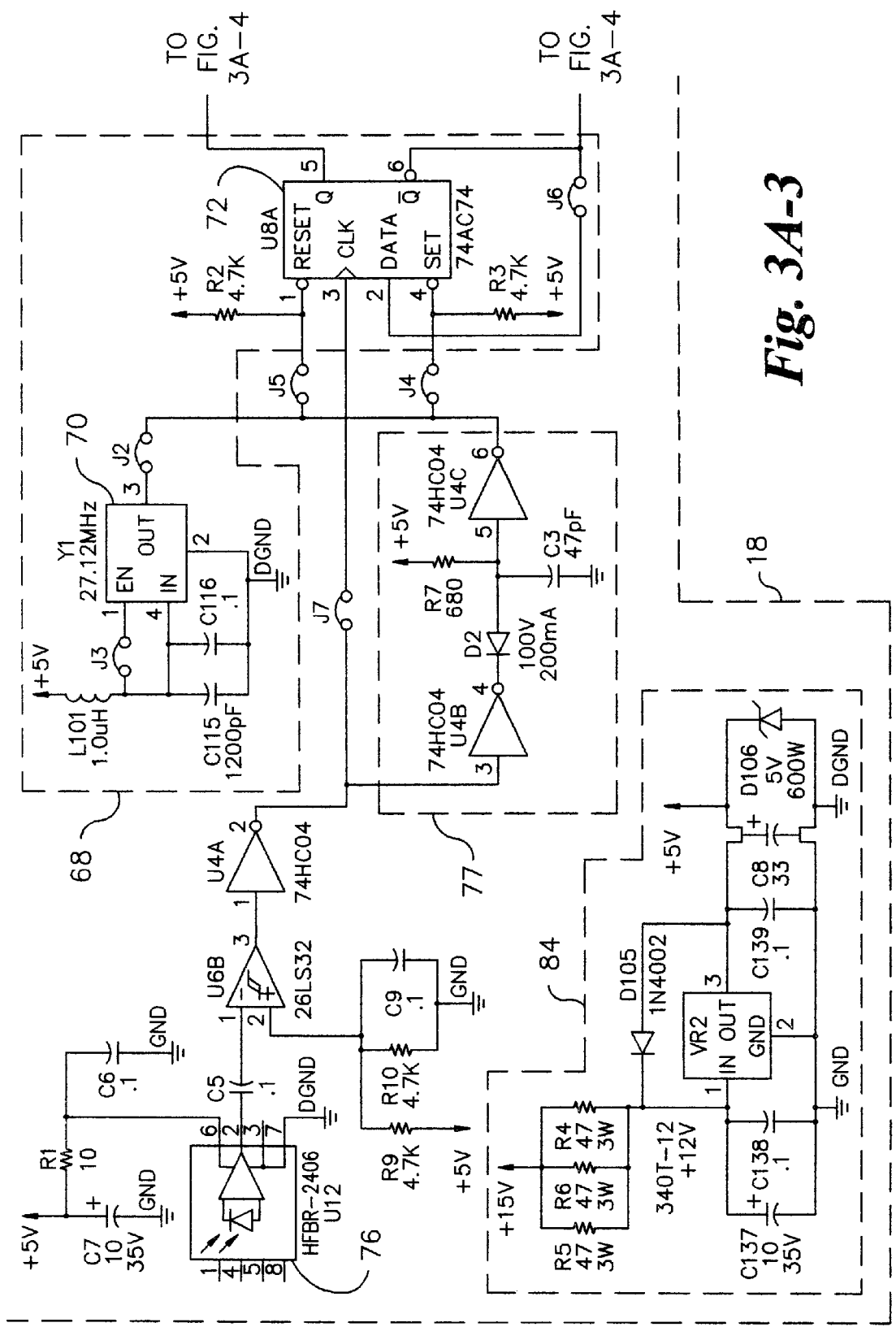

FIG. 2 is a schematic block diagram of selected portions of an RFID system 16 depicted to selectively highlight the three above-identified elements of the present invention. FIGS. 3A and 3B, taken together, provide a combination expanded, component level circuit diagram/schematic block diagram of one preferred embodiment of the RFID system 16 having the selected portions shown in FIG. 2, as well as additional portions. The circuit components of FIGS. 3A and 3B are described in conjunction with the elements of FIG. 2.

Figures 3, 3A, 4:
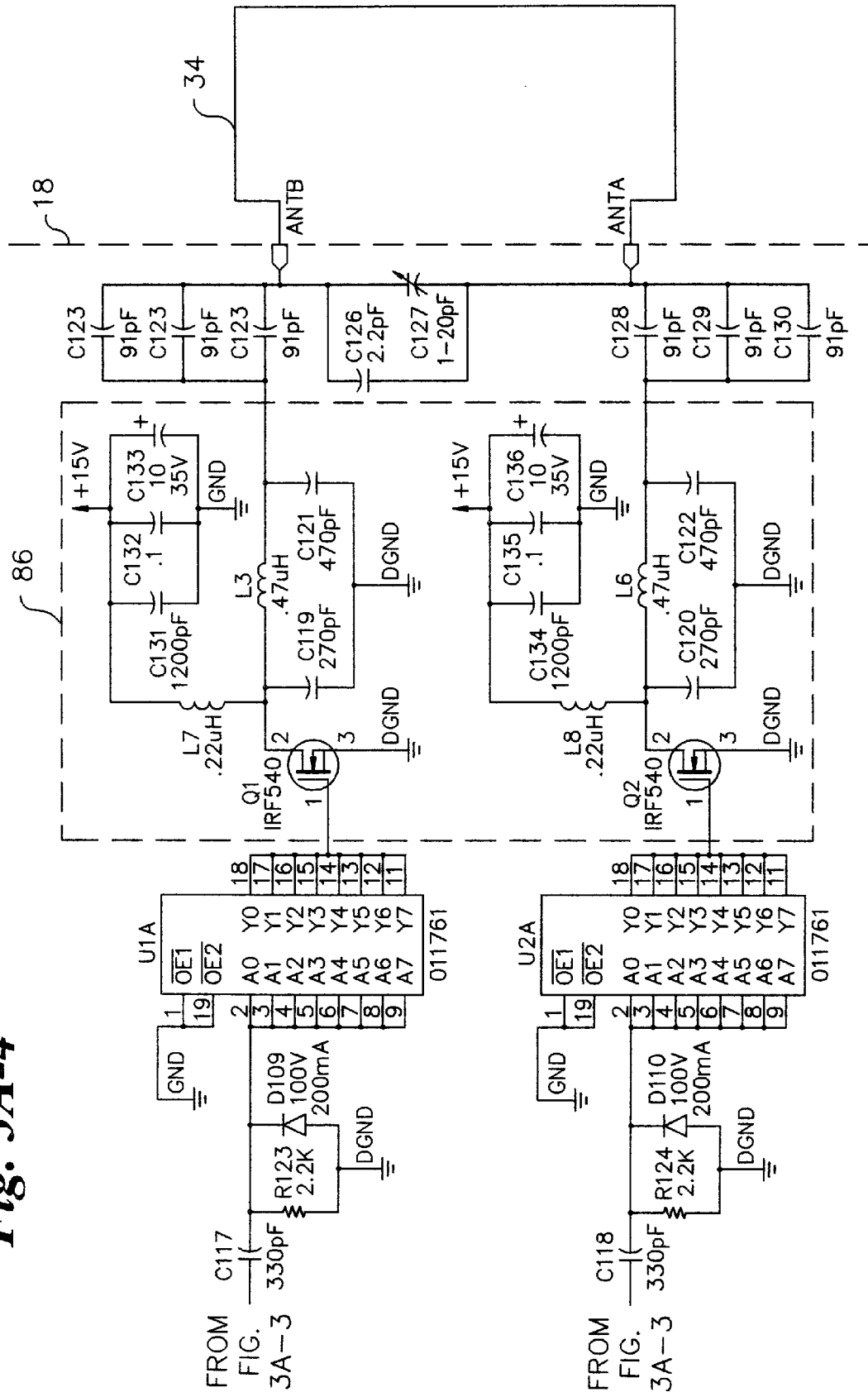
FIG. 4 is a schematic block diagram of an intelligent tag suitable for use with the present invention.
Figure 3B:
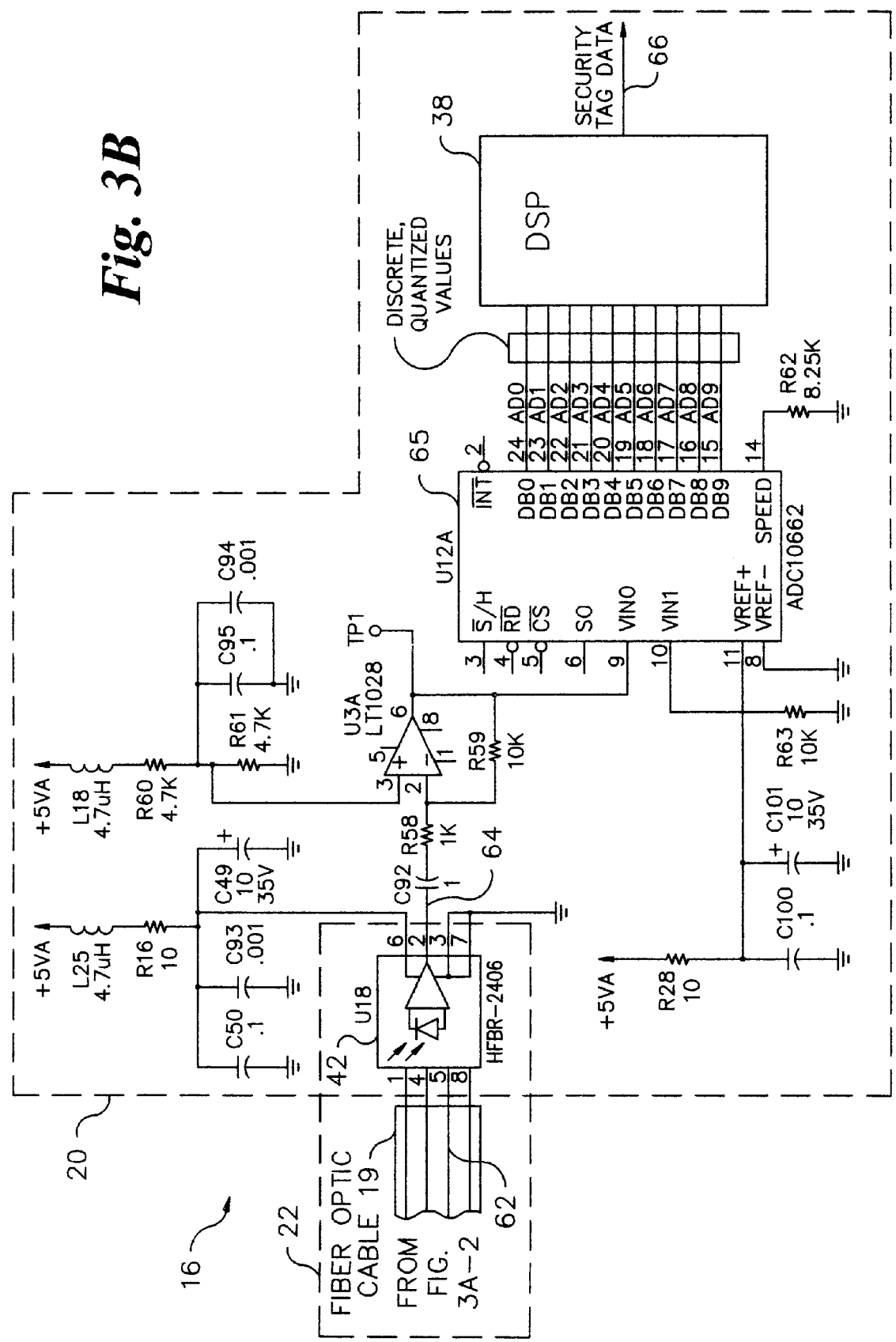
Figure 4:
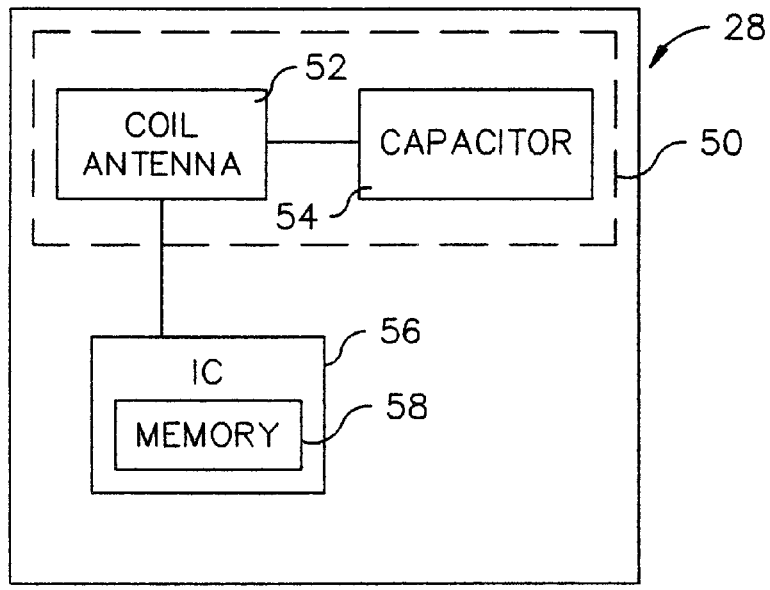

Referring to FIGS. 2, 3A, 3B and 4, the system 16 includes a transceiver module 18 (FIG. 3A), a tag response signal analyzing module 20 (FIG. 3B) and an optical interface in the form of an optical fiber interface 22 (FIGS. 3A and 3B). The transceiver module 18 includes a conventional receiver circuit 24 having an AM receiver. The receiver circuit 24 demodulates the data from the intelligent tag 28 (FIG. 4). Amplitude perturbations on the RF carrier are detected, amplified and limited by coupling energy directly from the receiver antenna. Detection, amplification and limiting are thus performed in the receiver circuit 24. The receiver circuit 24 outputs a demodulated tag response signal upon detecting an article 26 tagged with an intelligent tag 28 in a detection zone 30. The transceiver module 18 is connected to a conventional transmitter/receiver antenna assembly 32 which includes a transmitter loop antenna 34 for creating a detection zone and a receiver loop antenna 36 for picking up response signals transmitted from one or more intelligent tags 28. The antennas 34 and 36 may be separated, or may be colocated (i.e., both arranged on the same physical antenna). The transceiver module 18 is placed in close proximity to the driven antenna element(s). The antenna assembly 32 may be arranged as shown in FIG. 1 or in any other conventional manner. The transmitter loop antenna 36 has a predetermined fundamental field frequency. In the example described herein, the frequency is 13.56 MHz. However, the scope of the invention includes any frequency which is suitable for detecting resonant intelligent tags.

The tag response signal analyzing module 20 may be located in close proximity to the antenna assembly 32 and transceiver module 18, or it may be located remotely with respect to the antenna assembly 32 and transceiver module 18. The tag response signal analyzing module 20 includes an optical input, an A/D converter 65, and a conventional digital signal processing circuit (hereafter, digital signal processor 38 or DSP 38) which processes the digitized and quantized analog tag response signal and outputs intelligent tag data therefrom. The DSP 38 is preferably housed in a shielded box.

One important element of the present invention is the optical fiber interface 22 which is used in place of a conventional hardwired interface. The interface 22 includes an optical transmitter 40, an optical receiver 42 and a fiber optic cable or optical fiber 44 connected at one end to the optical transmitter 40 and connected at the other end to the optical receiver 42. The optical transmitter 40 and optical receiver 42 may be physically mounted on respective boards associated with the transceiver module 18 and tag response signal analyzing module 20 as shown in FIGS. 2, 3A and 3B, or they may be external to the boards associated with the transceiver module 18 and tag response signal analyzing module 20 (not shown). The optical fiber 44 may be any suitable length for connecting the respective boards, and may have one or more repeaters or optical amplifiers connected along its path, if necessary to maintain signal strength. As discussed above, the optical fiber 44 significantly reduces noise in the tag response signal by providing electrical isolation and breaking ground loops associated with hardwired connections, stopping internal switching noise from the DSP 38 from entering the receiver circuit 24, and preventing common mode signals from interfering with the desired tag response signal.

Experimental data shows that using an optical fiber interface instead of a conventional hardwired interface provides noise voltage reduction of an order of magnitude, or 20 decibels (db). Due to the significant noise reduction, the read range may be increased by a significant percentage compared to prior art RFID systems having a hardwired interface, on the order of at least six inches to one foot per interrogator. For example, a store entrance/exit having two interrogators would have a one to two foot aisle width improvement, each interrogator providing an extra six inches to one foot improvement in read range.

The preferred resonant intelligent tag for use with the present invention is a conventional RFID tag.

FIG. 4 shows general details of a sample RFID tag 28 suitable for use with the present invention. The intelligent tag 28 includes a passive resonant radio frequency (RF) circuit 50 for detecting when the tag 28 is within a zone monitored by a reader or interrogator, as is well known in the art. One well-known type of circuit 50 has a coil antenna 52 and a capacitor 54 which together form a resonant circuit with a predetermined (operational) resonant frequency (i.e., the selected radio frequency). Power for the intelligent tag 28 is derived from the antenna 52 in a conventional manner. Furthermore, the intelligent tag 28 includes an integrated circuit (IC) 56 for providing "intelligence" to the intelligent tag 28. The IC 56 is connected to the circuit 50. The IC 56 includes a programmable memory 58, as described below, for storing bits of identification or other data. The IC 56 outputs a data stream comprising stored data when sufficient power is applied thereto. In one embodiment of the invention, the data stream creates a series of data pulses by switching an extra capacitor (not shown) across the coil antenna 52 for the duration of the data pulses. This changes the resonant frequency of the RF circuit 50, detuning it from the operational frequency. Thus, instead of the RF circuit 50 returning a simple response signal at a single operational resonant frequency, it returns a modulated signal containing a packet of preprogrammed information from the memory 58. The packet of information (data pulses) is received and processed by interrogator receiving circuitry and is decoded (if necessary) to provide identification and/or other information about the tagged article. Other methods of using the data in the IC memory 58 to output identification data from the intelligent tag 28 are within the scope of the invention. The IC 56 is preferably also a passive device and is powered in the same manner as the RF circuit 50 (i.e., by using energy received at the antenna 52 from the interrogator transmitter signal). The intelligent tag 28 is thus a so-called RFID tag. Other types of RFID tags may be used with the present invention. Examples of other RFID tags which have circuitry suitable for use as part of the circuitry of the intelligent tag 28 are shown in U.S. Pate. Nos. 5,446,447 (Carney et al.), 5,430,441 (Bickley et al.), and 5,347,263 (Carroll et al.).

FIGS. 5A–5E show sample tag response signals originating from the intelligent tag 28 at the different stages of the circuit elements of FIGS. 2, 3A and 3B.

Figure 5A:
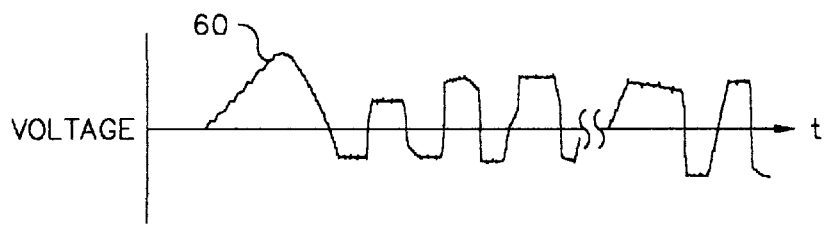
FIGS. 5A–5E are tag response signals at different stages in the system of FIGS. 3A and 3B.

FIG. 5A shows a portion of the unprocessed demodulated analog tag response signal at the output of the receiver circuit 24, labeled in FIG. 3A and FIG. 5A as signal 60. A typical analog tag response signal may have 154 bits and a peak voltage level in the range of about 50 millivolts. The signal is "analog" because it has a continuously variable voltage level and noise, compared to a digital signal which has clearly defined discrete values (e.g., 1, 2, 3, . . . ) which are ultimately expressed in groups of bits, and are represented by high and low logic levels.

Figure 5B:
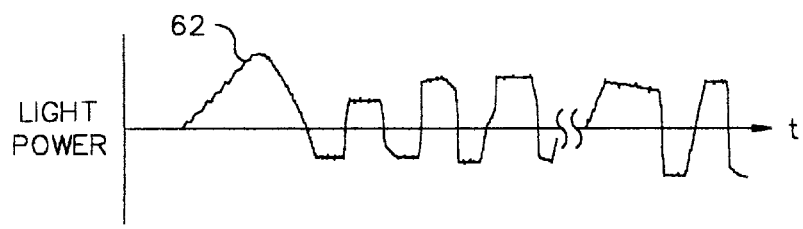

FIG. 5B shows a portion of the tag response signal as it appears in the optical fiber 44 and after being processed by the optical transmitter 40. The tag response signal at this stage is labeled in FIGS. 3A and 3B, and in FIG. 5B as signal 62. The signal 62 has the same waveform as the signal 60, but the amplitude represents light intensity, not voltage.

Figure 5C:
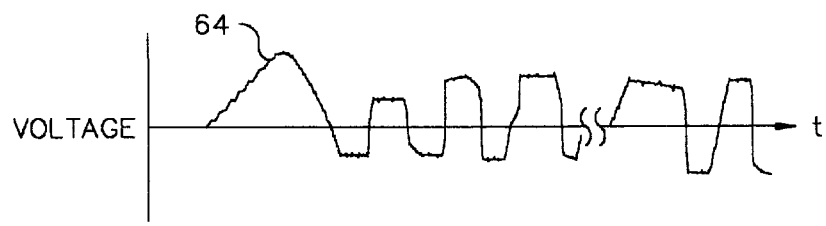

FIG. 5C shows a portion of the tag response signal as it appears at the output of the optical receiver 42 and before being input into the tag response signal analyzing module 20. The tag response signal at this stage is labeled in FIG. 3B and FIG. 5C as signal 64. The signal 64 has the same waveform as the signal 62, but the amplitude now represents an analog electrical voltage. The signal 64 is thus identical to the signal 60, assuming ideally operating conversion circuitry and a lossless optical fiber 44. The analog electrical voltage is quantized in an A/D converter 65 shown in FIG. 3B which converts the analog voltage to digital data for processing by the DSP 38. In the circuit shown in FIG. 3B, the signal at the output of the A/D converter 65 is a sequence of 10 bit words, represented in FIG. 5D as discrete, quantized values of the signal 64 which are input into the DSP 38.

Figure 5D:
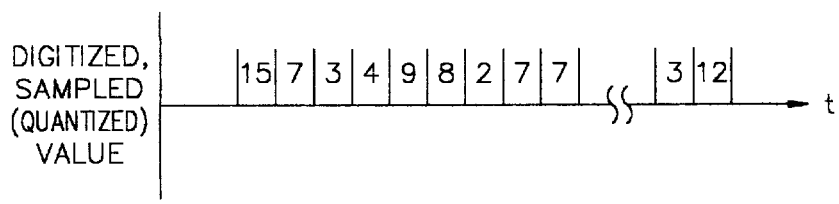
Figure 5E:
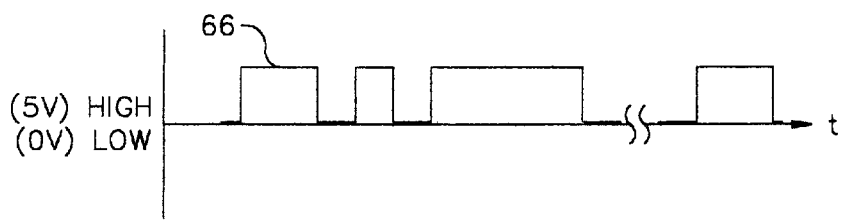

FIG. 5E shows a portion of the intelligent tag data 66 output from the DSP 38. This data provides the identification information of the intelligent tag 28 (e.g., RFID tag data in the case wherein the intelligent tag 28 is an RFID tag). The tag output signal is labeled in FIG. 3B and FIG. 5E as signal 66.

The quantized and digitized values and digital waveform shown in FIGS. 5D and 5E do not represent the signals shown in FIGS. 5A–5C at the same respective points in time, nor are the time periods in FIGS. 5D and 5E correlated with each other or with the time periods of FIGS. 5A–5C. FIGS. 5D and 5E are provided to illustrate the digital characteristics of a tag response signal, compared to the analog nature of the signal in FIGS. 5A–5C.

Some conventional RFID systems use fiber optics to transmit signals between system components. For example, U.S. Pat. No. 5,288,980 (Patel et al.) discloses that the communication link between an electronic data processor and a pass/not pass logic circuit may be a fiber optic cable. U.S. Pat. No. 5,440,300 (Spillman, Jr.) discloses a multiple embedded structure network wherein several smart structures embedded within panels are powered and interrogated by a network of conformal powering and data reception interrogation interface units which are connected by and serve as nodes along a common power/data bus cable. The cable may be a fiber optic cable. U.S. Pat. No. 5,353,011 (Wheeler et al.) discloses the use of fiber optic drivers, cables and receivers to distribute synchronization signals associated with phased local oscillators. In all three patents, only digital signals flow through the fiber optics. None of these three patents transmit unprocessed, analog tag response signals over the respective fiber optic media, and thus none of these patents provide the above-noted noise reducing advantages of the present invention.

FIGS. 2, 3A and 3B also show the second highlighted noise-reducing element of the present invention, namely a low noise signal generator 68 for driving the transmitter of the antenna assembly 32 at its fundamental field frequency. The signal generator includes an oscillator 70 having an output frequency which is an integer multiple n of the fundamental field frequency, and a frequency divider 72 (hereafter, "divide by n circuit 72") connected to the oscillator output, wherein n≧2. The output of the signal generator 68 is used to drive the transmitter of the antenna assembly 32 with the n-divided oscillator frequency. Specifically, the output of the signal generator 68 is connected to a resonant circuit driver or power driver circuit 86, which, in turn, drives the transmitter antenna 34. One preferred power driver circuit 86 is a type of Class E amplifier disclosed in U.S. patent application Ser. No. 08/911,843, filed Aug. 15, 1997, entitled "Drive Circuit For Reactive Loads," which is incorporated herein by reference. One embodiment of such a power driver circuit 86 is shown in FIG. 3A. However, the scope of the invention includes any suitable switched amplifier which accepts a digital input, including conventional Class C, D or E amplifiers.

The oscillator 70 may be mounted to the transceiver module 18 as shown in FIG. 3A, or the oscillator 70 may be external to the transceiver module 18 (not shown). In the external configuration, the oscillator output may be received by fiber optic circuitry 76. If so, the transceiver module 18 uses circuitry 77 to sense a "drop out," or an absence of the external oscillator, to synchronize to neighboring transceiver modules 18, either in phase by using jumper J5, or 180 degrees out of phase by using jumper J4.

FIG. 3A shows a preferred embodiment of the present invention wherein the divide by n circuit 72 is implemented with one or more cascaded toggle flip-flops. In FIG. 3A, n=2, so there is only one flip-flop. The field frequency is 13.56 MHz in the illustrated example. Accordingly, an oscillator 70 is chosen which has an output frequency of 27.12 MHz. To simplify the circuit implementation, n is preferably an even number. In this manner, multiple flip-flops may be cascaded to create divide by 4, 6, 8, etc . . . circuits. The flip-flop output signals are obtained from the Q and $\overline{Q}$ outputs of the final stage flip-flop. If n is an odd number, the circuit implementation is more complicated. One odd number implementation uses a counter and decoder to decode counter outputs. The scope of the invention includes values of n≧2. A practical range of values for n is 16>n≧2.

The theory behind the noise reducing function of the signal generator 68 is that a frequency divider attenuates noise power in the drive signal but does not attenuate the signal power of the drive signal. Consider the example wherein n=2. After the oscillator output signal is fed through a divide by 2 circuit, the amplitude of the phase noise sidebands at any given frequency offset are divided in half, whereas the amplitude of the signal portion is not divided. If the noise in the drive signal at a particular frequency offset is $\sigma_{DS}$, then the resultant noise in the drive signal after being fed through the divide by 2 circuit is ½ $\sigma_{DS}$ at the same frequency offset. The same principle applies if n is greater than 2. For example, if n=3, then the resultant noise is ⅓ $\sigma_{DS}$.

The low noise oscillator scheme described above significantly reduces noise in the RF field, thereby allowing the read range to be increased by a significant percentage compared to prior art RFID systems which do not use any such scheme. For example, a 10–20% improvement in detectability may be achieved using this scheme.

FIGS. 2 and 3A also show the third highlighted noise-reducing element of the present invention, namely the use of filtering on the DC power lines. The tag response signal analyzing module 20 provides isolated DC power to the transceiver module 18, which, in turn, uses the DC power to synthesize and drive RF currents in the transmitter antenna 34 at the fundamental field frequency. The DC power lines for the transceiver module 18 contain high and low frequency common mode filters 76 and 78, and high and low frequency differential mode suppression filters 80.

FIG. 3A also shows voltage regulators 82 and 84 for powering the circuits of the RFID system 16.

Figure 6:
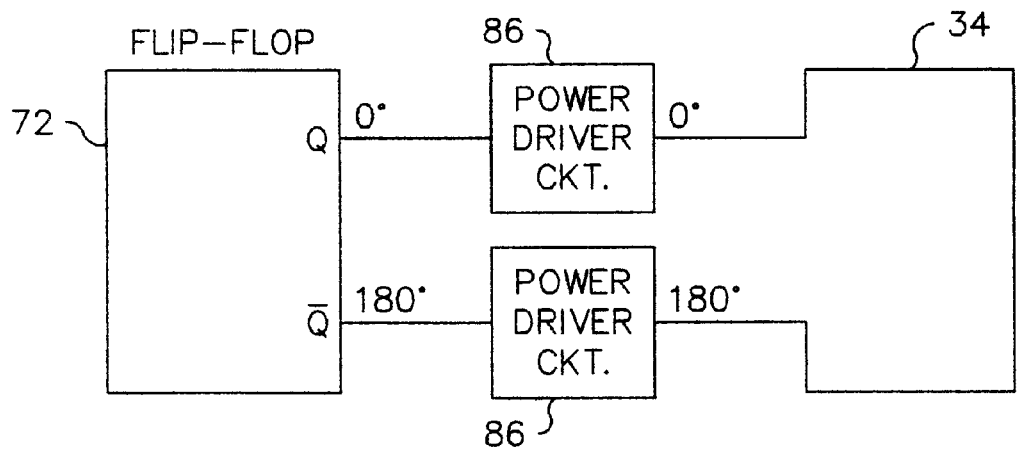
FIG. 6 is a simplified circuit diagram of a portion of FIGS. 3A and 3B.

FIG. 6 is a simplified circuit diagram which highlights portions of the preferred embodiment of the present invention wherein one or more toggle flip-flops 72 (one flip-flop in the illustrated divide by 2 embodiment) provide the dual function of (1) frequency dividing, and (2) providing non-phase inverted and phase inverted output signals to drive a transmitter. (The circuitry of FIG. 6 is shown in detail in FIG. 3A.)

Referring to FIG. 6, the output of the divide by 2 circuit is the Q and $\overline{Q}$ outputs of the flip-flop 72. The two outputs have a 180 degree phase difference, and the same frequency, as illustrated in FIG. 7. For simplicity, the Q output is labeled as having a 0 degree phase, and may be referred to as the "non-phase inverted output," and the $\overline{Q}$ output is labeled as having a 180 degree phase, and may be referred to as the "phase inverted output." The resultant output thus has a push-pull characteristic. By driving the transmitter antenna 34 with both outputs, the antenna 34 produces a continuous wave signal. A continuous wave signal provides better time opportunities for tag detection compared to a pulsed or burst wave scheme for a transmitter antenna, such as disclosed in FIG. 2 of U.S. Pat. No. 4,274,089 (Giles) which shows transmitter output signals in the pulse mode. Although FIG. 3 of U.S. Pat. No. 4,274,089 (Giles) discloses sending the Q output of a frequency dividing flip-flop to a transmitter of a resonant tag, the $\overline{Q}$ output (i.e., phase inverted output) is not sent to the tag transmitter.

One conventional technique to obtain a phase split (push-pull) signal for driving a transmitter antenna to generate a continuous wave signal is to use a transformer. For example, see FIG. 6 of U.S. Pat. No. 4,274,089 (Giles) operating in the continuous wave mode. A transformer is an analog device and generates significant noise, thereby defeating the goal of reducing system noise. The present invention maintains the drive signal in digital form as close as possible to the final stage and uses a digital device (flip-flop) to generate the phase split signals, thereby reducing the opportunities for noise to be generated in the system.

FIGS. 8 and 9 illustrate how the present invention uses digital signals as close as possible to the final stage to reduce noise in the drive signal circuitry. FIG. 8 is a conventional scheme 90 for driving an RFID transmitter antenna to produce a continuous wave signal. In this scheme, an analog device 92, such as a transformer, produces the phase split signals. The analog output of the transformer is amplified by a resonant circuit driver 94 which accepts an analog input, and the output of the driver is sent to the transmitter antenna 34. FIG. 9 shows the scheme 96 in accordance with the present invention. In this scheme, a digital device, namely one or more flip-flops 72, produces the phase split signals. The digital output of the flip-flop(s) 72 is input to a switched amplifier 96, which may be any suitable Class C, D or E amplifier capable of accepting a digital input. One such amplifier is disclosed in U.S. patent application Ser. No. 08/911,843, filed Aug. 15, 1997, entitled "Drive Circuit For Reactive Loads, an implementation of which is shown in FIG. 3A (see power driver circuit 86).

A less preferred embodiment of the RFID system 16 which is within the scope of the present invention uses only one output or one phase of the flip-flop 72. This scheme is provides only one-half of the signal voltage for a given input voltage compared to the preferred two phase scheme, but still provides the desired signal noise reduction and the continuous wave.

The RFID system 16 uses an amplitude-modulated response signal. However, other modulation schemes are within the scope of the invention, such as frequency modulation, pulse modulation, and phase modulation.

The optical interface disclosed herein is an optical fiber interface. However, other optical or light interface schemes may be used which permit light transmission and receiving of the analog tag response signal over a defined distance.

Although the RFID system described above uses RFID intelligent tags, the noise reduction schemes may be used in RFID systems that employ other types of resonant intelligent tag.

The noise reduction schemes described above improve tag detection and allow for a significantly increased read range. The present invention thus addresses a long-felt, and heretofore, unmet need in the industry for an RFID system with such improved capabilities.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. In a radio frequency identification (RFID) system having a detection zone for detecting the presence of an article in the detection zone wherein the article is tagged with a resonant intelligent tag,
    (a) a receiver circuit which outputs a demodulated analog tag response signal upon detection of the intelligent tag in the detection zone;
    (b) a tag response signal analyzing circuit including
        (i) an input, and
        (ii) a digital signal processing circuit which processes the analog tag response signal and outputs therefrom intelligent tag data; and
    (c) an optical interface connected at one end to the output of the receiver circuit and connected at the other end to the input of the tag response signal analyzing circuit for communicating the analog tag response signal from the receiver circuit to the tag response signal analyzing circuit.

2. In an RFID system according to claim 1, the optical interface including:
    (i) an optical transmitter,
    (ii) an optical receiver, and
    (iii) an optical fiber connected at one end to the output of the optical transmitter and at the other end to the input of the optical receiver.

3. In an RFID system according to claim 1, wherein the resonant intelligent tag is a radio frequency identification (RFID) tag.

4. In an RFID system according to claim 1, wherein the tag response signal is amplitude-modulated.

* * * * *